(12) United States Patent
Lee et al.

(10) Patent No.: US 12,028,467 B2
(45) Date of Patent: Jul. 2, 2024

(54) TERMINAL WITH ADJUSTABLE SCREEN SIZE

(71) Applicant: JRD Communication (Shenzhen) LTD., Shenzhen (CN)

(72) Inventors: Shiuanhung Lee, Shenzhen (CN); Yan Zhu, Shenzhen (CN); Fuqiang Ye, Shenzhen (CN); Jianwei Wang, Shenzhen (CN); Tianyuan Shi, Shenzhen (CN); Luqian Zhou, Shenzhen (CN); Shipeng Li, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 212 days.

(21) Appl. No.: 17/619,622

(22) PCT Filed: Dec. 12, 2019

(86) PCT No.: PCT/CN2019/124947
§ 371 (c)(1),
(2) Date: Dec. 16, 2021

(87) PCT Pub. No.: WO2021/072956
PCT Pub. Date: Apr. 22, 2021

(65) Prior Publication Data
US 2022/0353358 A1    Nov. 3, 2022

(30) Foreign Application Priority Data

Oct. 16, 2019  (CN) .......................... 201910983202.5

(51) Int. Cl.
*H04B 1/38*     (2015.01)
*H04M 1/02*    (2006.01)

(52) U.S. Cl.
CPC ....... *H04M 1/0237* (2013.01); *H04M 1/0264* (2013.01); *H04M 1/0268* (2013.01)

(58) Field of Classification Search
CPC ............. H04M 1/0237; H04M 1/0239; H04M 1/0247; H04M 1/0264; H04M 1/0268
See application file for complete search history.

(56) References Cited

U.S. PATENT DOCUMENTS 8,253,650 B2 *  8/2012  Sip ...................... H04M 1/0247
                                                                  345/169
9,258,396 B2    2/2016  Hwang
(Continued)

FOREIGN PATENT DOCUMENTS

| CN | 103763409 | 4/2014 |
| CN | 103929530 | 7/2014 |

(Continued)

OTHER PUBLICATIONS

Supplementary European Search Report and the European Search Opinion Dated Jul. 5, 2022 From the European Patent Office Re. Application No. 19949369.3. (7 Pages).
(Continued)

*Primary Examiner* — Tuan Pham

(57) ABSTRACT

A terminal with an adjustable screen size includes: a first body; a second body disposed opposite to the first body; one or more stepping motors disposed on the first body or the second body and configured to drive a relative movement of the first body and the second body; a rotating shaft disposed on the second body; a chain plate driven around the rotating shaft, wherein a side of the chain plate is fixedly connected to the first body; and a flexible display screen flatly fixed onto the chain plate.

18 Claims, 5 Drawing Sheets

(56) References Cited

U.S. PATENT DOCUMENTS

| | | | |
|---|---|---|---|
| 10,148,799 B2 * | 12/2018 | O'Neill | H04M 1/185 |
| 10,209,741 B2 | 2/2019 | Wang et al. | |
| 10,881,009 B2 | 12/2020 | Jiang | |
| 11,159,662 B2 | 10/2021 | Cao | |
| 11,343,361 B2 * | 5/2022 | He | H04M 1/0237 |
| 2007/0155450 A1 * | 7/2007 | Juan | H04M 1/0237 455/575.4 |
| 2017/0075388 A1 | 3/2017 | Yee et al. | |
| 2019/0261519 A1 | 8/2019 | Park et al. | |
| 2019/0302841 A1 * | 10/2019 | Sun | G06F 1/1637 |
| 2021/0044683 A1 | 2/2021 | He et al. | |
| 2022/0057843 A1 | 2/2022 | Kim et al. | |

FOREIGN PATENT DOCUMENTS

| | | |
|---|---|---|
| CN | 103941816 | 7/2014 |
| CN | 104539764 | 4/2015 |
| CN | 106603756 | 4/2017 |
| CN | 106713554 | 5/2017 |
| CN | 106875846 | 6/2017 |
| CN | 108259649 | 7/2018 |
| CN | 109151097 | 1/2019 |
| WO | WO 2019/107909 | 6/2019 |

OTHER PUBLICATIONS

Notification of Office Action and Search Report Dated Aug. 4, 2020 From the State Intellectual Property Office of the People's Republic of China Re. Application No. 201910983202.5 and Its Translation of Office Action Into English. (5 Pages).

International Search Report and the Written Opinion Dated Jul. 15, 2020 From the International Searching Authority Re. Application No. PCT/CN2019/124947 and Its Translation of Search Report Into English. (8 Pages).

* cited by examiner

TERMINAL WITH ADJUSTABLE SCREEN SIZE

RELATED APPLICATIONS

This application is a National Phase of PCT Patent Application No. PCT/CN2019/124947 having International filing date of Dec. 12, 2019, which claims the benefit of priority Chinese of Chinese Patent Application No. 201910983202.5 filed on Oct. 16, 2019. The contents of the above applications are all incorporated by reference as if fully set forth herein in their entirety.

FIELD AND BACKGROUND OF THE INVENTION

The present disclosure relates to the technical field of electronic devices and flexible display screens, and particularly to a terminal with an adjustable screen size.

With the development of technology, appearances of electronic devices have changed dramatically. Flexible display screens have attracted much attention for their unique characteristics and huge potential. Compared with traditional screens, a flexible display screen has characteristics of high flexibility and bendability, which can reduce a degree of accidental damage to an electronic device. The flexible display screen has a much higher durability than other types of screens. Additionally, the flexible display screen provides a new way of interaction based on its characteristic of high bendability, which can meet more users' needs for electronic devices.

The flexible display screen allows users to expand the flexible display screen when a large screen is needed, and fold the flexible display screen when a small screen is needed. However, this design will increase a thickness of the entire device. Moreover, the so-called folding can only be carried out along a pre-designed folding line, and a screen size after folding is relatively fixed. In other words, in a current electronic device with a flexible display screen, a screen size can also be adjusted, but the screen size cannot be adjusted freely according to users' needs. This is not conducive to meeting users' needs for screen sizes in various situations.

SUMMARY OF THE INVENTION

The present disclosure provides a terminal with an adjustable screen size, which can solve the technical problem that a screen size of a terminal in the prior art cannot be adjusted freely according to users' needs.

In a first aspect, the present disclosure provides a terminal with an adjustable screen size, comprising:
  a first body;
  a second body disposed opposite to the first body;
  one or more stepping motors disposed on the first body or the second body and configured to drive a relative movement of the first body and the second body;
  a rotating shaft disposed on the second body;
  a chain plate driven around the rotating shaft, wherein a side of the chain plate is fixedly connected to the first body; and
  a flexible display screen flatly fixed onto the chain plate.

In an embodiment, the terminal comprises two stepping motors separately disposed on two ends of the first body or the second body.

In an embodiment, each of the stepping motors comprises a motor body and a guide rod. An end of the guide rod is connected to the motor body. The guide rod extends toward and contracts from the rotating shaft under control of the motor body.

In an embodiment, the motor body controls an extension size of the guide rod to gradually become longer, and the guide rod drives the second body to move to the left relative to the first body.

In an embodiment, the first body comprises a bearing portion and a first back cover. The stepping motors are disposed on the bearing portion. A right side of the first back cover is fixedly connected to a side of the bearing portion, and a left side of the first back cover extends toward the second body. The second body comprises a second back cover. The rotating shaft, the chain plate, and the flexible display screen are disposed on a same side of the first back cover and a same side of the second back cover. The first back cover is disposed inside the second back cover and the two can slide relatively. A right side of the second back cover is close to the first body.

In an embodiment, an orthographic projection of the flexible display screen falls within a maximum orthographic projection of the first back cover and the second back cover. The maximum orthographic projection is an orthographic projection of the first back cover and the second back cover when the first body has a maximum displacement relative to the second body. An orthographic projection of one of the first back cover and the second back cover is equal to a minimum orthographic projection of the terminal, and an orthographic projection of the other is less than or equal to the minimum orthographic projection of the terminal. The minimum orthographic projection is the orthographic projection of the first back cover and the second back cover when the first body has a minimum displacement relative to the second body.

In an embodiment, the first body further comprises a first side protective plate and a second side protective plate. The first side protective plate is disposed on an upper side of the first back cover and perpendicular to the first back cover. The second side protective plate is disposed on a lower side of the first back cover and perpendicular to the first back cover. The second body further comprises a third side protective plate, a fourth side protective plate, and a fifth side protective plate. The third side protective plate is disposed on an upper side of the second back cover, perpendicular to the second back cover, and outside the first side protective plate. The fourth side protective plate is disposed on a lower side of the second back cover, perpendicular to the second back cover, and outside the second side protective plate. Upper and lower ends of the rotating shaft are respectively connected to the third side protective plate and the fourth side protective plate. The fifth side protective plate is disposed on a left side of the second back cover, perpendicular to the second back cover, and adjacent to a left side of the flexible display screen.

In an embodiment, a sum of lengths of the first side protective plate and the third side protective plate is greater than or equal to a length of the flexible display screen. A sum of lengths of the second side protective plate and the fourth side protective plate is greater than or equal to the length of the flexible display screen. A length of one of the first side protective plate and the third side protective plate is equal to a minimum width of the terminal, and a length of the other is less than or equal to the minimum width of the terminal. A length of one of the second side protective plate and the fourth side protective plate is equal to the minimum width of the terminal, and a length of the other is less than or equal to the minimum width of the terminal. The minimum width of the terminal is a width of a display area of the terminal when the first body has a minimum displacement relative to the second body.

In an embodiment, the first body is provided with a first control button and a second control button. The first control button is configured to allow a user to control operation and stop of the stepping motors. The second control button is configured to allow the user to control the stepping motors to drive the relative movement of the first body and the second body.

In an embodiment, the first control button and the second control button are disposed on an outside of the first body and exposed.

In an embodiment, the terminal further comprises a front camera and a rear camera.

The front camera is disposed on a side of the first body close to the flexible display screen. The front camera is an under-screen camera. The rear camera is disposed on a side of the first body away from the flexible display screen.

In a second aspect, the present disclosure provides a terminal, comprising:
a first body;
a second body disposed opposite to the first body;
a rotating shaft disposed on the second body;
two stepping motors separately disposed on two ends of the first body or the second body and configured to drive a relative movement of the first body and the second body, wherein each of the stepping motors comprises a motor body and a guide rod, an end of the guide rod is connected to the motor body, and the guide rod extends toward and contracts from the rotating shaft under control of the motor body;
a chain plate driven around the rotating shaft, wherein a side of the chain plate is fixedly connected to the first body; and
a flexible display screen flatly fixed onto the chain plate.

In a terminal with an adjustable screen size provided by the present disclosure, a rotating shaft is disposed on a body, a chain plate is driven around the rotating shaft, and a side of the chain plate is fixedly connected to another body. One of the bodies is provided with a stepping motor. By controlling rotation of the stepping motor, a relative movement of the two bodies is driven to control a distance between the two bodies, so that the chain plate and a flexible display screen flatly fixed onto the chain plate are simultaneously narrowed and widened. Users can freely control starting and stopping of the stepping motors according to their needs, so as to freely control final expanded sizes of the chain plate and the flexible display screen. Therefore, this is conducive to freely adjusting the screen size of the terminal according to users' needs, so as to meet users' needs for screen sizes in various situations.

BRIEF DESCRIPTION OF THE SEVERAL VIEWS OF THE DRAWINGS

In order to more clearly illustrate technical solutions in embodiments of the present disclosure, a brief description of accompanying drawings used in a description of the embodiments will be given below. Obviously, the accompanying drawings in the following description are merely some embodiments of the present disclosure. For those skilled in the art, other drawings may be obtained from these accompanying drawings without creative labor.

DESCRIPTION OF SPECIFIC EMBODIMENTS OF THE INVENTION

Figure 1:
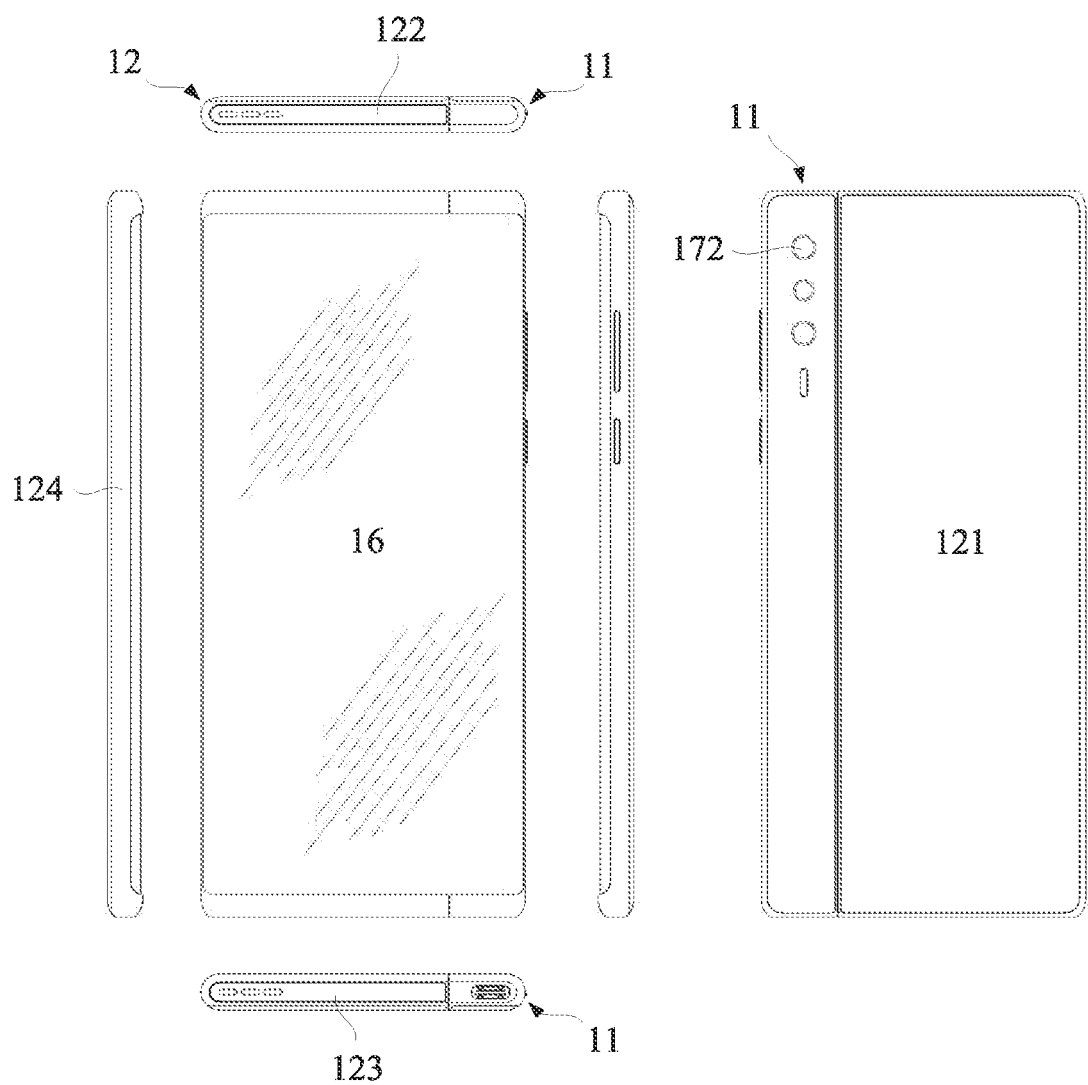
FIG. 1 is a six-sided view of a terminal according to an embodiment of the present disclosure when its screen is not expanded.

Technical solutions in embodiments of the present disclosure are clearly and completely described below in conjunction with accompanying drawings. It is apparent that the described embodiments are merely a part of the embodiments of the present disclosure and not all embodiments. All other embodiments obtained by those skilled in the art based on the embodiments of the present disclosure without creative labor are within the claimed scope of the present disclosure. In a case of no conflict, the following embodiments and their technical features can be combined with each other.

In the description of the present disclosure, it should be understood that location or position relationships indicated by terms, such as "center", "longitudinal", "transverse", "length", "width", "thickness", "up", "down", "front", "rear", "left", "right", "vertical", "horizontal", "top", "bottom", "inside", and "outside" are location or position relationships based on illustration of the accompanying drawings, are merely used for describing the present disclosure and simplifying the description instead of indicating or implying the indicated apparatuses or elements should have specified locations or be constructed and operated according to specified locations, and Thereof, should not be intercepted as limitations to the present disclosure. Furthermore, structural elements with same or similar characteristics may be indicated by same or different reference numerals in the present disclosure. In addition, terms such as "first" and "second" are used merely for description, but shall not be construed as indicating or implying relative importance or implicitly indicating a number of the indicated technical feature. Hence, the feature defined with "first" and "second" may explicitly or implicitly includes one or more such features. In the description of the present disclosure, a term "a plurality of" means "two or more" unless otherwise specifically limited.

In the present disclosure, a term "exemplary" means "serving as an example, instance, or illustration." Any embodiment described herein as "exemplary" is not necessarily construed as being more preferable or advantageous than other embodiments. The following description is presented to enable any skilled in the art to make and use the present invention. Details are set forth in the following description for purpose of explanation. It should be noted that those skilled in the art can realize that the present invention can also be implemented without using these specific details. In other embodiments, well-known structures and processes are not elaborated, so as to prevent unnecessary details from obscuring a description of the present invention. Therefore, the present invention is not intended to be limited by the embodiments, but is accorded with the widest scope consistent with principles and features disclosed herein.

A current terminal with a flexible display screen can only be folded along a pre-designed folding line. Although a screen size can be adjusted, the screen size after adjustment (i.e., folding) is relatively fixed. The screen size cannot be adjusted freely according to users' needs. In order to solve this problem, the present disclosure provides a terminal. Please refer to FIG. 1 to FIG. 5, the terminal comprises:

a first body 11;

a second body 12 disposed opposite to the first body 11;

one or more stepping motors 13 disposed on the first body 11;

a rotating shaft 14 disposed on the second body 12;

a chain plate 15 driven around the rotating shaft 14, wherein a side of the chain plate 15 is fixedly connected to the first body 11; and a flexible display screen 16 flatly fixed onto the chain plate 15.

Figure 2:
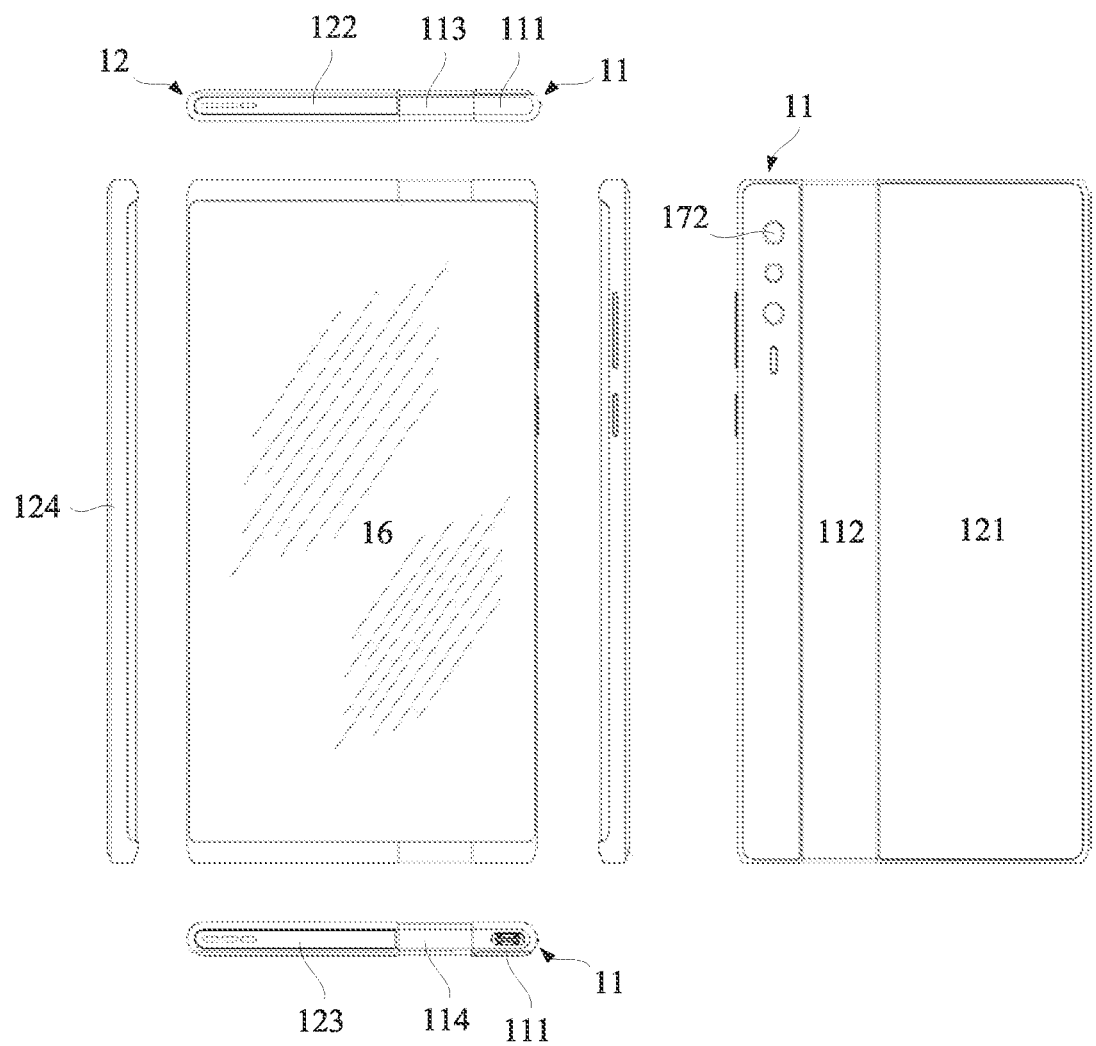
FIG. 2 is a six-sided view of the terminal of FIG. 1 when its screen is not fully expanded.
Figure 3:
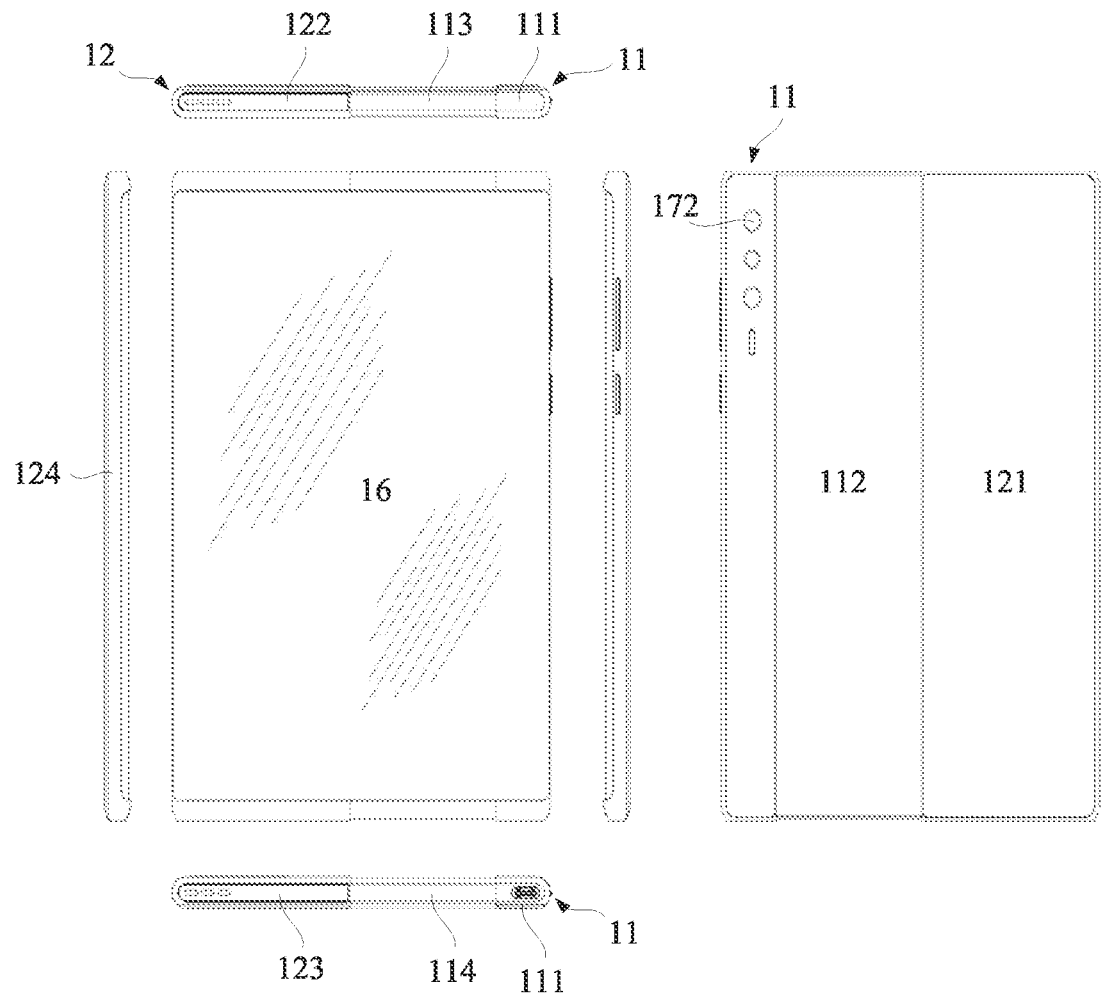
FIG. 3 is a six-sided view of the terminal of FIG. 1 when its screen is fully expanded.
Figure 4:
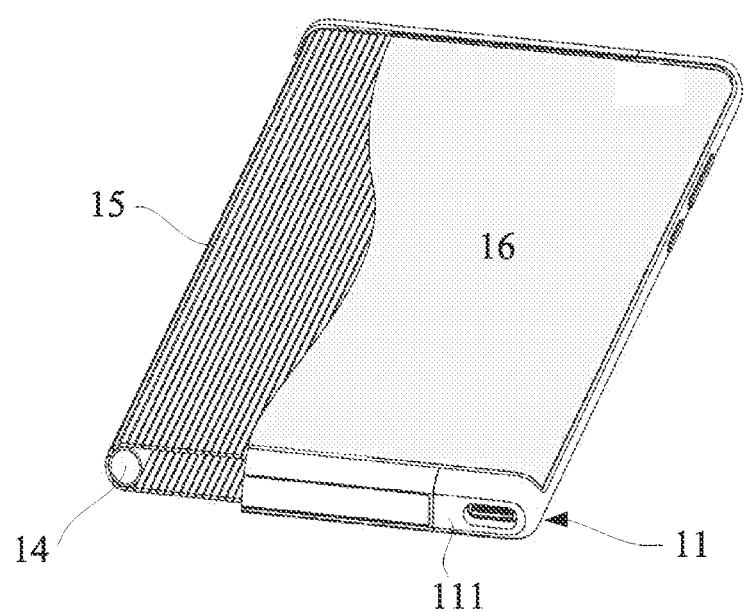
FIG. 4 is a structural cross-sectional view of the terminal of FIG. 1.

Please refer to FIG. 1, FIG. 2, and FIG. 3 in sequence. The stepping motors 13 run and drive the second body 12 to move to the left relative to the first body 11. For example, it can be considered that the first body 11 and the stepping motors 13 disposed thereon remain stationary, and the second body 12 and the rotating shaft 14 disposed thereon move to the left. During this process, the rotating shaft 14 rotates clockwise, and the chain plate 15 is driven around the rotating shaft 14. A back part of the chain plate 15 is driven toward a light-emitting surface of the terminal and becomes smaller. At the same time, a front part of the chain plate 15 becomes larger. That is, the chain plate 15 is gradually expanded on the light-emitting surface of the terminal. As the chain plate 15 expands, the flexible display screen16 expands simultaneously. An expanded size of the flexible display screen 16 becomes larger, and a screen size of the terminal becomes larger.

During this process, users can control the stepping motors 13 to stop rotating at any time according to their needs, so that final expanded sizes of the chain plate 15 and the flexible display screen16 can be freely controlled.

Please refer to FIG. 3, FIG. 2, and FIG. 1 in sequence, the stepping motors 13 rotate and drive the second body 12 to move to the right relative to the first body 11. For example, it can be considered that the first body 11 and the stepping motors 13 disposed thereon remain stationary, and the second body 12 and the rotating shaft 14 disposed thereon move to the right. During this process, the rotating shaft 14 rotates counterclockwise, and the chain plate 15 is driven around the rotating shaft 14. The front part of the chain plate 15 is driven toward a back surface of the terminal. The back part of the chain plate 15 becomes larger while the front part of the chain plate 15 becomes smaller. That is, the chain plate 15 is gradually contracted on the light-emitting surface of the terminal. As the chain plate 15 contracts, the flexible display screen16 contracts simultaneously. The expanded size of the flexible display screen 16 becomes smaller, and the screen size of the terminal becomes smaller.

During this process, users can control the stepping motors 13 to stop rotating at any time according to their needs, so that the final expanded sizes of the chain plate 15 and the flexible display screen16 can also be freely controlled.

Accordingly, the stepping motors 13 rotate and drive the relative movement of the first body 11 and the second body 12 to control a distance between the first body 11 and the second body 12, so that the chain plate 15 and the flexible display screen 16 flatly fixed onto the chain plate 15 are simultaneously expanded and contracted. Users can freely control starting and stopping of the stepping motors 13 according to their needs, so as to freely control the final expanded sizes of the chain plate 15 and the flexible display screen 16. Therefore, this is conducive to freely adjusting the screen size of the terminal according to users' needs, so as to meet users' needs for screen sizes in various situations.

It should be noted that the stepping motors 13 may be disposed on the second body 12, and can also drive the relative movement of the first body 11 and the second body 12.

Figure 5:
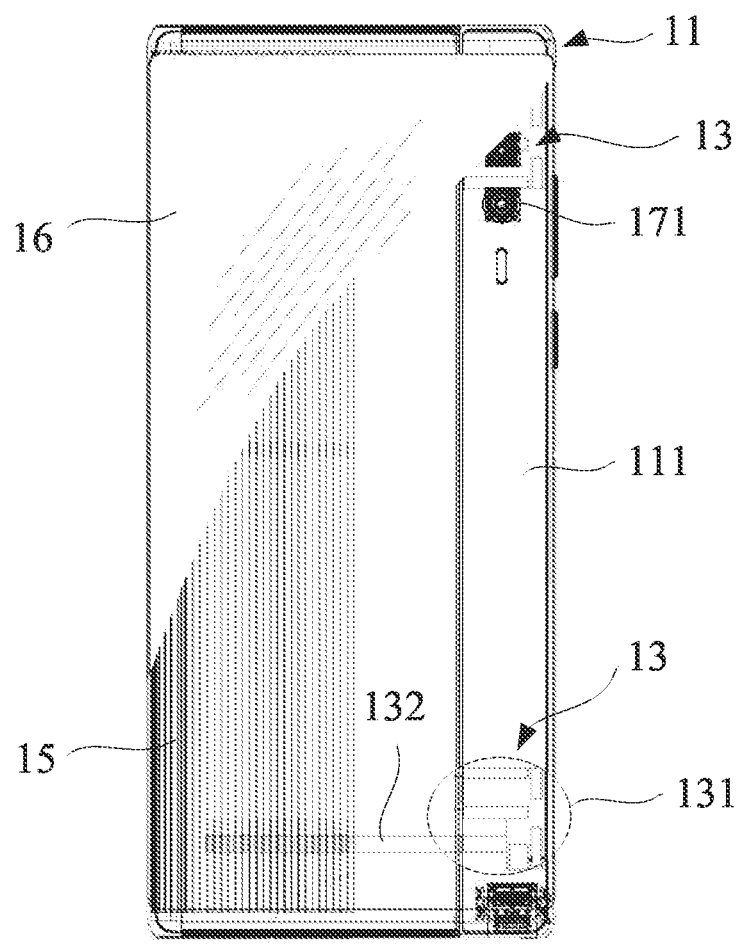
FIG. 5 is another structural cross-sectional view of the terminal of FIG. 1.

In a specific embodiment, please refer to FIG. 5, each of the stepping motors 13 may comprise a motor body 131 and a guide rod 132. The guide rod 132 is perpendicular to extending directions of the first body 11 and the second body 12. An end (a right end in FIG. 5) of the guide rod 132 is connected to the motor body 131, and can extend toward the rotating shaft 14 under control of the motor body 131. For example, the other end of the guide rod 132 may be connected to the second body 12.

In a process of adjusting the screen size of the terminal from small to large, the motor body 131 controls an extension size of the guide rod 132 to become longer, and the guide rod 132 drives the second body 12 to move to the left relative to the first body 11. In a process of adjusting the screen size of the terminal from large to small, the motor body 131 controls the extension size of the guide rod 132 to gradually become short, and the guide rod 132 drives the second body 12 to move to the right relative to the first body 11.

The terminal may be provided with an even number of the stepping motors 13 symmetrically distributed along an extension direction of the first body 11. For example, please refer to FIG. 5, the terminal has two stepping motors 13 symmetrically disposed on upper and lower parts of the first body 11. Accordingly, the even number of the stepping motors 13 can be started and stopped synchronously to make the second body 12 receive uniform forces in a same direction, which helps to ensure that a direction of the relative movement of the first body 11 and the second body 12 is consistent and not easily deflected.

The terminal may also be provided with an odd number of the stepping motors 13, and one of the stepping motors 13 is disposed in a middle of the first body 11 along the extension direction of the first body 11. Along the extension direction of the first body 11, an even number of the remaining stepping motors 13 are symmetrically distributed with the one of the stepping motors 13 as a center. The even number of the stepping motors 13 and the stepping motor 13 disposed in the middle of the first body 11 can be started and stopped synchronously and work together, which also makes the second body 12 receive uniform forces in a same direction, and the relative movement is not easily deflected.

In an embodiment, control commands may be issued using a control button. The control command is used to control the starting and stopping of the stepping motors 13, so as to adjust a final expanded size of the terminal. For example, when a user presses the control button this time, a control command is generated to control the stepping motors 13 to start. Next time when the user presses the control button, a control command is generated to control f the stepping motors 13 to stop. The control button may be implemented as two sub-buttons. For example, the two sub-buttons may be named a first sub-button and a second sub-button. The first sub-button is configured to generate a control command to start the stepping motors 13 when the user presses it. The second sub-button is configured to generate a control command to stop the stepping motors 13 when the user presses it.

In addition, in an embodiment, whether the screen size of the terminal becomes larger or smaller may also be controlled by another control button. To facilitate distinction, the aforementioned control button for controlling the starting and stopping of the stepping motors 13 may be referred to as a first control button, and the control button described herein and used to control whether the screen size of the terminal becomes larger or smaller may be referred to as a second control button.

The second control button may comprise two sub-buttons. For example, the two sub-buttons comprised in the second control button may be named a third sub-button and a fourth sub-button. When the screen size needs to be changed from large to small, the user presses the third sub-button to control the stepping motors 13 to drive the second body 12 to move to the right relative to the first body 11. When the screen size needs to be changed from small to large, the user presses the fourth sub-button to control the stepping motors 13 to drive the second body 12 to move to the left relative to the first body 11.

The third sub-button and the fourth sub-button may be integrated into one button. That is, the second control button may be implemented as one button. When the screen size of the terminal needs to be adjusted from large to small, the user may click the second control button to control the stepping motors 13 to drive the second body 12 to move to the right relative to the first body 11. When the screen size of the terminal needs to be adjusted from small to large, the user may double-click or long press the second control button to control the stepping motors 13 to drive the second body 12 to move to the left relative to the first body 11.

One of the first control button and the second control button may be a physical button or a virtual button, which is not limited in the embodiments of the present disclosure. The physical button may be disposed on an outside, such as a right side, of the first body 11 and exposed.

Different from issuing corresponding control commands by the control buttons as described previously, in other embodiments, the corresponding control commands may be generated by voice recognition or the user's gestures collected by a camera. Taking the user's gestures collected by the camera as an example, the user's finger may move to the right in the air; the camera collects the user's gesture, and the terminal generates a control command to control the stepping motors 13 to drive the second body 12 to move to the right relative to the first body 11, so as to adjust the screen size of the terminal from large to small. When the user's finger moves to the left in the air, the camera collects the user's gesture, and the terminal generates a control command to control the stepping motors 13 to drive the second body 12 to move to the left relative to the first body 11, so as to adjust the screen size of the terminal from small to large.

In the present disclosure, the terminal may be, but is not limited to, a mobile terminal such as a smart phone and a personal digital assistant or tablet computer (PDA), or a wearable device with applications that is worn on a limb or embedded in a garment, an ornament, or an accessory.

Taking the smart phone as an example, the first body 11 may be used to bear components of the terminal, such as cameras and various sensors. As shown in FIG. 1 and FIG. 5, the cameras may comprise a front camera 171 and a rear camera 172. The front camera 171 may be an under-screen camera. The flexible display screen 16 is provided with an opening. The front camera 171 is exposed in the opening and collects images. A number of the rear camera 172 may be one or more, and they are disposed on a side of the first body 11 away from the flexible display screen 16, i.e., on a back surface of the first body 11.

The first body 11 may comprise a bearing portion 111, a first back cover 112, a first side protective plate, and a second side protective plate. The bearing portion 111 is configured to bear the components of the terminal, such as cameras and various sensors. A volume control button, a charging interface, and a data transmission interface of the terminal may also be disposed on the bearing portion 111. When the terminal is placed face up, a right side of the first back cover 112 is fixedly connected to a side of the bearing portion 111, and a left side of the first back cover 112 extends toward the second body 12. The first side protective plate 113 is disposed on an upper side of the first back cover 112 and perpendicular to the first back cover 112. The first side protective plate 113 is configured to shield an upper side of the terminal to prevent internal components thereof from being exposed. A length (a dimension in a horizontal direction in the drawings) of the first side protective plate 113 may be equal to a width (a dimension in the horizontal direction in the drawings) of the first back cover 112. The second side protective plate 114 is disposed on a lower side of the first back cover 112 and perpendicular to the first back cover 112. The second side protective plate 114 is configured to shield a lower side of the terminal to prevent the internal components thereof from being exposed. A length (a dimension in the horizontal direction in the drawings) of the second side protective plate 114 may be equal to the width (the dimension in the horizontal direction in the drawings) of the first back cover 112, i.e., same as the length of the first side protective plate 113.

The second body 12 may comprise a second back cover 121, a third side protective plate 122, a fourth side protective plate 123, and a fifth side protective plate 124. The first back cover 112 and the second back cover 121 together constitute a back cover of the terminal. The rotating shaft 14, the chain plate 15, and the flexible display screen 16 are disposed on a same side of the first back cover 112 and a same side of the second back cover 121. The first back cover 112 is disposed inside the second back cover 121 and the two can slide relatively. A right side of the second back cover 121 is close to the first body 11. The third side protective plate 122 is disposed on an upper side of the second back cover 121, perpendicular to the second back cover 121, and outside the first side protective plate 112. The third side protective plate 122 is configured to shield the upper side of the terminal to prevent the internal components thereof from being exposed. A length (a dimension in the horizontal direction in the drawings) of the third side protective plate 122 may be equal to a width (a dimension in the horizontal direction in the drawings) of the second back cover 121. The fourth side protective plate 123 is disposed on a lower side of the second back cover 121, perpendicular to the second back cover 121, and outside the second side protective plate 114. The fourth side protective plate 123 is configured to shield the lower side of the terminal to prevent the internal components thereof from being exposed. A length (a dimension in the horizontal direction in the drawings) of the fourth side protective plate 123 may be equal to the width of the second back cover 121, i.e., same as the length of the third side protective plate 122. Upper and lower ends of the rotating shaft 14 are respectively connected to the third side protective plate 122 and the fourth side protective plate 123. The fifth side protective plate 124 is disposed on a left side of the second back cover 121, perpendicular to the second back cover 121, and adjacent to a left side of the flexible display screen 16, so as to shield a right side of the terminal.

When the stepping motors 13 rotate and drive the relative movement of the first body 11 and the second body 12, the first back cover 112 and the second back cover 121 slide relatively synchronously. At the same time, the first side protective plate 113 and the third side protective plate 122 slide relatively synchronously, and the second side protective plate 114 and the fourth side protective plate 123 slide relatively synchronously. An overlapping area of the first back cover 112 and the second back cover 121 becomes larger or smaller according to the direction of the relative movement, so that an area of the back cover of the terminal changes accordingly. For example, when the first body 11 moves to the left relative to the second body 12, the overlapping area of the first back cover 112 and the second back cover 121 becomes larger, and the area of the back cover of the terminal becomes larger. When the first body 11 moves to the right relative to the second body 12, the overlapping area of the first back cover 112 and the second back cover 121 becomes smaller, and the area of the back cover of the terminal becomes smaller.

In this embodiment, an orthographic projection of the flexible display screen 16 falls within a maximum orthographic projection of the first back cover 112 and the second back cover 121. The maximum orthographic projection is an orthographic projection of the first back cover 112 and the second back cover 121 when the first body 11 has a maximum displacement relative to the second body 12. Accordingly, when the first body 11 has the maximum displacement relative to the second body 12, i.e., when the terminal shown in FIG. 3 is in a fully expanded state, the back cover formed of the first back cover 112 and the second back cover 121 will have no gaps, thereby preventing the internal components from being exposed.

Furthermore, an orthographic projection of one of the first back cover 112 and the second back cover 121 is equal to a minimum orthographic projection of the terminal, and an orthographic projection of the other is less than or equal to the minimum orthographic projection of the terminal. The minimum orthographic projection is the orthographic projection of the first back cover 112 and the second back cover 121 when the first body 11 has a minimum displacement relative to the second body 12. Accordingly, when the first body 11 is not displaced relative to the second body 12, i.e., when the terminal shown in FIG. 1 is in an unexpanded state, one of the first back cover 112 and the second back cover 121 with the largest orthographic projection completely overlaps the back cover of the terminal.

Similarly, a sum of lengths of the first side protective plate 113 and the third side protective plate 122 is greater than or equal to a length (a dimension in the horizontal direction in the drawings) of the flexible display screen 16. A sum of lengths of the second side protective plate 114 and the fourth side protective plate 123 is greater than or equal to the length of the flexible display screen 16. Accordingly, when the first body 11 has the maximum displacement relative to the second body 12, i.e., when the terminal shown in FIG. 3 is in the fully expanded state, an upper side frame of the terminal composed of the first side protective plate 113 and the third side protective plate 122, and a lower side frame of the terminal composed of the second side protective plate 114 and the fourth side protective plate 123, will have no gaps, thereby preventing the internal components from being exposed.

A length of one of the first side protective plate 113 and the third side protective plate 122 is equal to a minimum width of the terminal, and a length of the other is less than or equal to the minimum width of the terminal. A length of one of the second side protective plate 114 and the fourth side protective plate 123 is equal to the minimum width of the terminal, and a length of the other is less than or equal to the minimum width of the terminal. The minimum width of the terminal is a width (a dimension in the horizontal direction in the drawings) of a display area of the terminal when the first body 11 has a minimum displacement relative to the second body 12. The width of the display area is a width of the expanded flexible display screen 16. Accordingly, when the first body 11 is not displaced relative to the second body 12, i.e., when the terminal shown in FIG. 1 is in the unexpanded state, the upper side frame of the terminal composed of the first side protective plate 113 and the third side protective plate 122, and the lower side frame of the terminal composed of the second side protective plate 114 and the fourth side protective plate 123, will have no gaps, thereby preventing the internal components from being exposed.

Please refer to FIG. 1 to FIG. 5, the present disclosure further provides a terminal comprising:
  a first body 11;
  a second body 12 disposed opposite to the first body 11;
  a rotating shaft 14 disposed on the second body 12;
  two stepping motors 13 separately disposed on two ends of the first body 11 or the second body 12 and configured to drive a relative movement of the first body 11 and the second body 12, wherein each of the stepping motors 13 comprises a motor body 131 and a guide rod 132, an end of the guide rod 132 is connected to the motor body 131, and the guide rod 132 extends toward and contracts from the rotating shaft 14 under control of the motor body 131;
  a chain plate 15 driven around the rotating shaft 14, wherein a side of the chain plate 15 is fixedly connected to the first body 11; and
  a flexible display screen 16 flatly fixed onto the chain plate15.

The motor body 131 controls an extension size of the guide rod 132 to gradually become longer, and the guide rod 132 drives the second body 12 to move to the left relative to the first body 11.

Specifically, the first body 11 comprises a bearing portion 111 and a first back cover 112. The stepping motors 13 are disposed on the bearing portion 111. A right side of the first back cover 112 is fixedly connected to a side of the bearing portion 111, and a left side of the first back cover 112 extends toward the second body 12.

The second body 12 comprises a second back cover 121. The rotating shaft 14, the chain plate 15, and the flexible display screen 16 are disposed on a same side of the first back cover 112 and a same side of the second back cover 121. The first back cover 112 is disposed inside the second back cover 121 and the two can slide relatively. A right side of the second back cover 121 is close to the first body 11.

An orthographic projection of the flexible display screen 16 falls within a maximum orthographic projection of the first back cover 112 and the second back cover 121. The maximum orthographic projection is an orthographic projection of the first back cover 112 and the second back cover 121 when the first body 11 has a maximum displacement relative to the second body 12. An orthographic projection of one of the first back cover 112 and the second back cover 121 is equal to a minimum orthographic projection of the terminal, and an orthographic projection of the other is less than or equal to the minimum orthographic projection of the terminal. The minimum orthographic projection is the orthographic projection of the first back cover 112 and the second back cover 121 when the first body 11 has a minimum displacement relative to the second body 12.

Specifically, the first body 11 further comprises a first side protective plate 113 and a second side protective plate 114. The first side protective plate 113 is disposed on an upper side of the first back cover 112 and perpendicular to the first back cover 112. The second side protective plate 114 is disposed on a lower side of the first back cover 112 and perpendicular to the first back cover 112.

The second body 12 further comprises a third side protective plate 122, a fourth side protective plate 123, and a fifth side protective plate 124. The third side protective plate 122 is disposed on an upper side of the second back cover 121, perpendicular to the second back cover 121, and outside the first side protective plate 113. The fourth side protective plate 123 is disposed on a lower side of the second back cover 121, perpendicular to the second back cover 121, and outside the second side protective plate 114. Upper and lower ends of the rotating shaft 14 are respectively connected to the third side protective plate 122 and the fourth side protective plate 123. The fifth side protective plate 124 is disposed on a left side of the second back cover 121, perpendicular to the second back cover 121, and adjacent to a left side of the flexible display screen 16.

A sum of lengths of the first side protective plate 113 and the third side protective plate 122 is greater than or equal to a length of the flexible display screen 16. A sum of lengths of the second side protective plate 114 and the fourth side protective plate 123 is greater than or equal to the length of the flexible display screen 16. A length of one of the first side protective plate 113 and the third side protective plate 122 is equal to a minimum width of the terminal, and a length of the other is less than or equal to the minimum width of the terminal. A length of one of the second side protective plate 114 and the fourth side protective plate 123 is equal to the minimum width of the terminal, and a length of the other is less than or equal to the minimum width of the terminal. The minimum width of the terminal is a width of a display area of the terminal when the first body 11 has a minimum displacement relative to the second body 12.

The first body 11 is provided with a first control button and a second control button. The first control button is configured to allow a user to control starting and stopping of the stepping motors 13. The second control button is configured to allow the user to control the stepping motors 13 to drive the relative movement of the first body 11 and the second body 12.

The first control button and the second control button are disposed on an outside of the first body 11 and exposed.

Specifically, the terminal further comprises a front camera 171 and a rear camera 172. The front camera 171 is disposed on a side of the first body 11 close to the flexible display screen 16. The front camera 171 is an under-screen camera. The rear camera 172 is disposed on a side of the first body 11 away from the flexible display screen 16.

Specifically, for specific implementation of the terminal in this embodiment, reference may be made to the aforementioned embodiment, and will not be described in detail herein.

Although the present invention has been illustrated and described with respect to one or more implementations, equivalent alterations and modifications will occur to those skilled in the art based on a reading and understanding of the present disclosure and the accompanying drawings. The present invention comprises all such modifications and alterations and is limited only by the scope of the following claims. In particular regard to various functions performed by components described above, terms used to describe such components are intended to correspond, unless otherwise indicated, to any component which performs the specified function of the described component (e.g., that is functionally equivalent), even if it is not structurally equivalent to the disclosed structure that performs the function in exemplary implementations of the present disclosure.

That is, what described above are only the embodiments of the present disclosure, but are not intended to limit the scope of the present invention. Any equivalent structures or equivalent process flow modifications (e.g., combinations of technical features described in the embodiments) that are made according to the present disclosure and the accompanying drawings, or any direct or indirect applications of the present disclosure in other related technical fields shall all be covered within the scope of the present invention.

In addition, although a specific feature of the present invention may have been disclosed with respect to only one of several implementations, such feature may be combined with one or more other features of the other implementations as may be desired and advantageous for any given or particular application.

What is claimed is:

1. A terminal with an adjustable screen size, comprising:
    a first body, comprising:
        a bearing portion; and
        a first back cover, wherein a right side of the first back cover is fixedly connected to a side of the bearing portion;
    a second body disposed opposite to the first body, wherein the second body comprises a second back cover, and a left side of the first back cover extends toward the second body;
    one or more stepping motors disposed on the first body or the second body and configured to drive a relative movement of the first body and the second body;
    a rotating shaft disposed on the second body;
    a chain plate driven around the rotating shaft, wherein a side of the chain plate is fixedly connected to the first body; and
    a flexible display screen flatly fixed onto the chain plate;
    wherein the rotating shaft, the chain plate, and the flexible display screen are disposed on a same side of the first back cover and a same side of the second back cover, the first back cover is disposed inside the second back cover and the two can slide relatively, and a right side of the second back cover is close to the first body.

2. The terminal according to claim 1, wherein the terminal comprises two stepping motors separately disposed on two ends of the first body or the second body.

3. The terminal according to claim 1, wherein each of the stepping motors comprises:
    a motor body; and
    a guide rod, wherein an end of the guide rod is connected to the motor body, and extends toward and contracts from the rotating shaft under control of the motor body.

4. The terminal according to claim 3, wherein the motor body controls an extension size of the guide rod to gradually become longer, and the guide rod drives the second body to move to the left relative to the first body.

5. The terminal according to claim 1, wherein
    an orthographic projection of the flexible display screen falls within a maximum orthographic projection of the first back cover and the second back cover;
    the maximum orthographic projection is an orthographic projection of the first back cover and the second back cover when the first body has a maximum displacement relative to the second body;

an orthographic projection of one of the first back cover and the second back cover is equal to a minimum orthographic projection of the terminal, and an orthographic projection of the other is less than or equal to the minimum orthographic projection of the terminal; and the minimum orthographic projection is the orthographic projection of the first back cover and the second back cover when the first body has a minimum displacement relative to the second body.

6. The terminal according to claim 1, wherein
the first body further comprises:
  a first side protective plate disposed on an upper side of the first back cover and perpendicular to the first back cover; and
  a second side protective plate disposed on a lower side of the first back cover and perpendicular to the first back cover; and
the second body further comprises:
  a third side protective plate disposed on an upper side of the second back cover, perpendicular to the second back cover, and outside the first side protective plate;
  a fourth side protective plate disposed on a lower side of the second back cover, perpendicular to the second back cover, and outside the second side protective plate, wherein upper and lower ends of the rotating shaft are respectively connected to the third side protective plate and the fourth side protective plate; and
  a fifth side protective plate disposed on a left side of the second back cover, perpendicular to the second back cover, and adjacent to a left side of the flexible display screen.

7. The terminal according to claim 6, wherein
a sum of lengths of the first side protective plate and the third side protective plate is greater than or equal to a length of the flexible display screen;
a sum of lengths of the second side protective plate and the fourth side protective plate is greater than or equal to the length of the flexible display screen;
a length of one of the first side protective plate and the third side protective plate is equal to a minimum width of the terminal, and a length of the other is less than or equal to the minimum width of the terminal;
a length of one of the second side protective plate and the fourth side protective plate is equal to the minimum width of the terminal, and a length of the other is less than or equal to the minimum width of the terminal; and
the minimum width of the terminal is a width of a display area of the terminal when the first body has a minimum displacement relative to the second body.

8. The terminal according to claim 1, wherein the first body is provided with a first control button and a second control button, the first control button is configured to allow a user to control starting and stopping of the stepping motors, and the second control button is configured to allow the user to control the stepping motors to drive the relative movement of the first body and the second body.

9. The terminal according to claim 8, wherein the first control button and the second control button are disposed on an outside of the first body and exposed.

10. The terminal according to claim 1, further comprising:
a front camera disposed on a side of the first body close to the flexible display screen, wherein the front camera is an under-screen camera; and
a rear camera disposed on a side of the first body away from the flexible display screen.

11. A terminal, comprising:
a first body, comprising:
  a bearing portion; and
  a first back cover, wherein a right side of the first back cover is fixedly connected to a side of the bearing portion;
a second body disposed opposite to the first body, wherein the second body comprises a second back cover, and a left side of the first back cover extends toward the second body;
a rotating shaft disposed on the second body;
two stepping motors separately disposed on two ends of the first body or the second body and configured to drive a relative movement of the first body and the second body, wherein each of the stepping motors comprises a motor body and a guide rod, an end of the guide rod is connected to the motor body, and the guide rod extends toward and contracts from the rotating shaft under control of the motor body;
a chain plate driven around the rotating shaft, wherein a side of the chain plate is fixedly connected to the first body; and
a flexible display screen flatly fixed onto the chain plate;
wherein the rotating shaft, the chain plate, and the flexible display screen are disposed on a same side of the first back cover and a same side of the second back cover, the first back cover is disposed inside the second back cover and the two can slide relatively, and a right side of the second back cover is close to the first body.

12. The terminal according to claim 11, wherein the motor body controls an extension size of the guide rod to gradually become longer, and the guide rod drives the second body to move to the left relative to the first body.

13. The terminal according to claim 11, wherein
an orthographic projection of the flexible display screen falls within a maximum orthographic projection of the first back cover and the second back cover;
the maximum orthographic projection is an orthographic projection of the first back cover and the second back cover when the first body has a maximum displacement relative to the second body;
an orthographic projection of one of the first back cover and the second back cover is equal to a minimum orthographic projection of the terminal, and an orthographic projection of the other is less than or equal to the minimum orthographic projection of the terminal; and
the minimum orthographic projection is the orthographic projection of the first back cover and the second back cover when the first body has a minimum displacement relative to the second body.

14. The terminal according to claim 11, wherein
the first body further comprises:
  a first side protective plate disposed on an upper side of the first back cover and perpendicular to the first back cover; and
  a second side protective plate disposed on a lower side of the first back cover and perpendicular to the first back cover; and
the second body further comprises:
  a third side protective plate disposed on an upper side of the second back cover, perpendicular to the second back cover, and outside the first side protective plate;

a fourth side protective plate disposed on a lower side of the second back cover, perpendicular to the second back cover, and outside the second side protective plate, wherein upper and lower ends of the rotating shaft are respectively connected to the third side protective plate and the fourth side protective plate; and a fifth side protective plate disposed on a left side of the second back cover, perpendicular to the second back cover, and adjacent to a left side of the flexible display screen.

15. The terminal according to claim 14, wherein
a sum of lengths of the first side protective plate and the third side protective plate is greater than or equal to a length of the flexible display screen;
a sum of lengths of the second side protective plate and the fourth side protective plate is greater than or equal to the length of the flexible display screen;
a length of one of the first side protective plate and the third side protective plate is equal to a minimum width of the terminal, and a length of the other is less than or equal to the minimum width of the terminal;
a length of one of the second side protective plate and the fourth side protective plate is equal to the minimum width of the terminal, and a length of the other is less than or equal to the minimum width of the terminal; and
the minimum width of the terminal is a width of a display area of the terminal when the first body has a minimum displacement relative to the second body.

16. The terminal according to claim 11, wherein the first body is provided with a first control button and a second control button, the first control button is configured to allow a user to control starting and stopping of the stepping motors, and the second control button is configured to allow the user to control the stepping motors to drive the relative movement of the first body and the second body.

17. The terminal according to claim 16, wherein the first control button and the second control button are disposed on an outside of the first body and exposed.

18. The terminal according to claim 11, further comprising:
a front camera disposed on a side of the first body close to the flexible display screen, wherein the front camera is an under-screen camera; and
a rear camera disposed on a side of the first body away from the flexible display screen.

* * * * *